Oct. 2, 1928.

R. B. PITT 1,686,030

ROPE CONVEYER

Filed July 11, 1927  2 Sheets-Sheet 1

INVENTOR
ROBERT B. PITT,
By his Attorneys,

Oct. 2, 1928.

R. B. PITT 1,686,030

ROPE CONVEYER

Filed July 11, 1927   2 Sheets-Sheet 2

INVENTOR
ROBERT B. PITT,
By his Attorneys,

Patented Oct. 2, 1928.

1,686,030

UNITED STATES PATENT OFFICE.

ROBERT BRINDLEY PITT, OF BATH, ENGLAND, ASSIGNOR TO STOTHERT & PITT, LIMITED, OF NEWARK WORKS, BATH, ENGLAND.

ROPE CONVEYER.

Application filed July 11, 1927, Serial No. 204,925, and in Great Britain October 6, 1926.

This invention relates to rope conveyers of the type in which a plurality, usually a pair, of endless parallel ropes support and convey a belt, trays buckets or the like.

According to this invention I provide a rope conveyer with means for automatically disengaging the ropes from the belt, trays, buckets or the like at any suitable point or points of the travel of the conveyer, whereby unequal stretching of the ropes will be rendered immaterial.

In one way of carrying my invention into effect, as applied to a belt conveyed and supported by a pair of ropes, the ropes are normally clamped in jaws on axles secured to the belt, the clamping being effected by arms which are pivoted to the said axles and upon which are mounted wheels running upon cam tracks, which are so shaped as to allow the arms to rock about their pivots and release the ropes from the jaws and consequently from the belt.

The belt and the ropes, thus separated, pass over pulleys, after which the axles engage inclined tracks which cause the belt, and consequently the jaws on the axles, to move towards the ropes. The tracks upon which the wheels run are then of such shape that the arms are rocked on their pivots to their original position, and the ropes are again clamped in the jaws.

Figure 1:
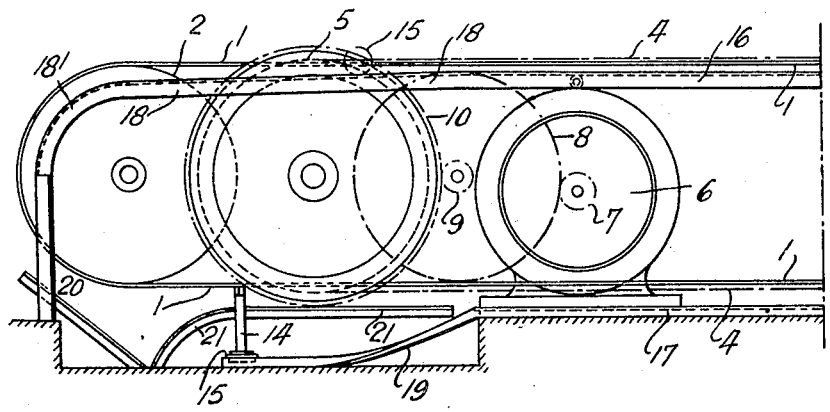
Figure 2:
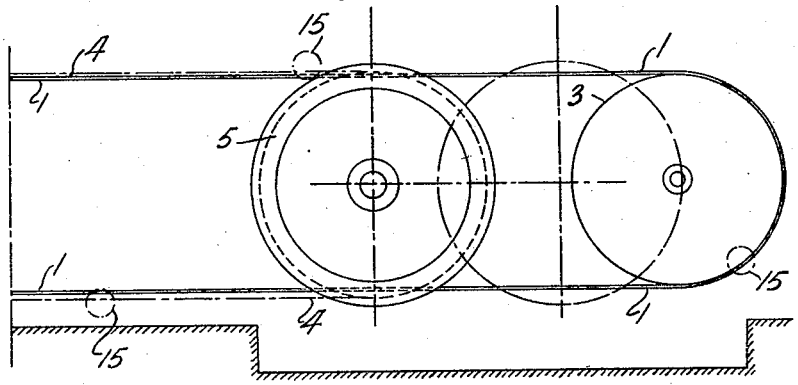
Figure 3:
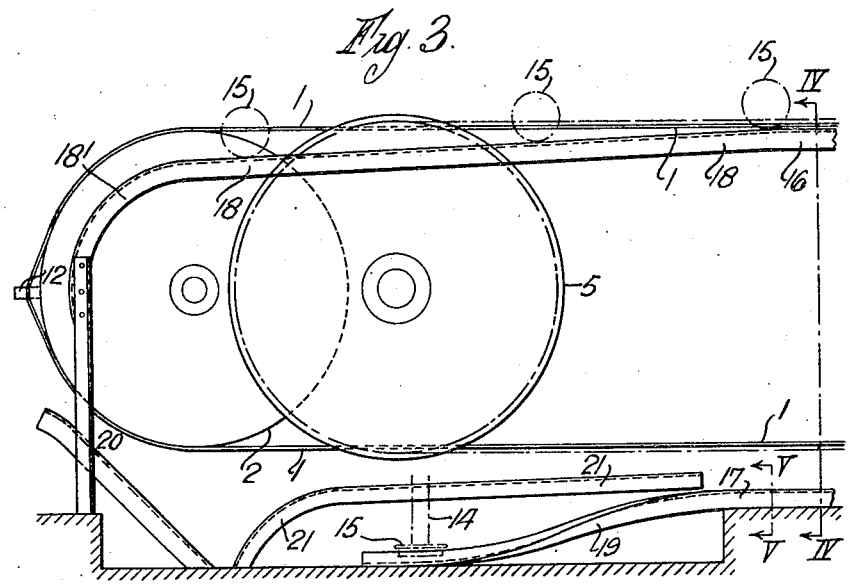

The invention is illustrated in the accompanying drawings, in which Fig. 1 is an elevation of one end of the conveyer and Fig. 2 an elevation of the other end thereof. Fig. 3 is a detail elevation of Fig. 1 with the driving gear omitted, Fig. 4 a section on the line IV—IV Fig. 3, and Fig. 5 a section on the line V—V Fig. 3.

Figure 5:
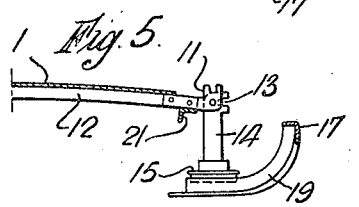

1 is an endless belt which passes over pulleys 2 and 3, and 4 are endless ropes each of which passes over rope pulleys 5, that pulley 5 seen in Fig. 1 being driven by an electrically operated motor 6 through gear wheels 7, 8, 9 and 10, or by other means. The belt is normally clamped to the ropes 4 between jaws 11 formed on cambered axles 12 secured to the belt 1, and jaws 13 (see Fig. 5) formed on arms 14 pivotally mounted on the axles 12 and provided with wheels 15 which normally run on guide tracks 16, 17; the tracks 16 are downwardly inclined at 18 and the tracks 17 are extended at 19 as seen in Figs. 1, 3 and 5. 20 are guide bars, and 21 are skidder bars adapted to support the axles 12.

Figure 4:
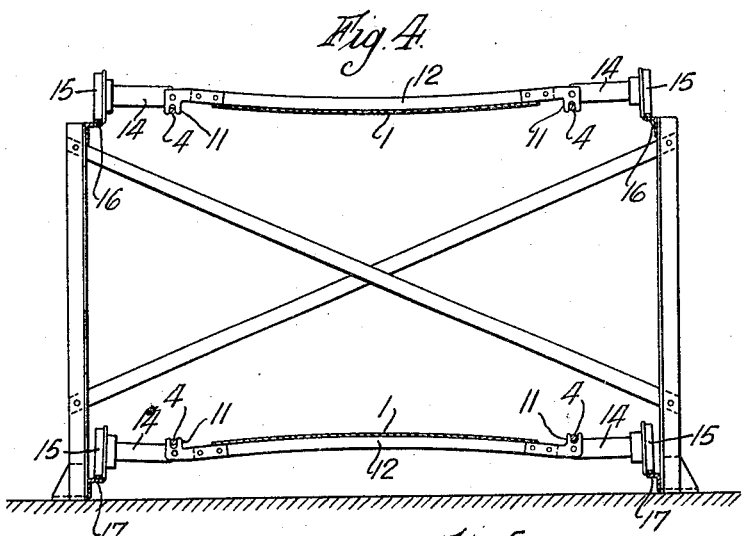

When the parts are in the position shown in Fig. 4 the belt 1 is clamped to the ropes 4 by the jaws 11 and 13; as the belt comes towards the end of the conveyer i. e. as it moves to the left in Figs. 1 and 3 the wheels 15 are allowed to drop slightly by the inclined part 18 of the track 16 and the arms 14 consequently allowed to rock about their pivots, thus unclamping the jaws 11 and 13 from the ropes 4 which pass around the pulleys 5. When the belt is at the end of the conveyer the wheels 15 are guided by the curved portion 18$^1$ of the track and then allowed to drop and are guided by the guide bars 20. The arms 14 and wheels 15 now depend from the belt as seen in Figs. 1, 3 and 5 and in this position, the axles 12 are supported by the skidder bars 21 (see Fig. 5).

The wheels 15 and arms 14 are now moved back to the position shown in Fig. 4 in which position the jaws 11 on the axles 12 again engage the ropes 4 the belt 1 thereby being again connected to the ropes 4.

It will thus be seen that since each rope is disconnected from the belt, any slack in either of the ropes can be taken up independently by any suitable tension mechanism thus rendering immaterial the difference of the stretch of the two ropes.

What I claim is:—

1. In a conveyer, the combination of a plurality of endless parallel ropes, means for driving the ropes, a belt conveyer, jaws carried by said conveyer and adapted to receive the ropes, clamping arms carried by said jaws and adapted to clamp the ropes in the jaws, rollers carried by said arms, cam guides engaged by said rollers and so shaped as to cause the arms to move out of clamping position at a suitable point on the travel of the belt, and cam guides so shaped as to move the arms into clamping position.

2. In a conveyer, the combination of a plurality of endless parallel ropes, means for driving the ropes, a belt conveyer, axles carried by said belt and provided with jaws adapted to receive the ropes, arms pivotally mounted on said axles and adapted to clamp the ropes in the jaws, cam guides engaged by said rollers and adapted to allow the arms to rock out of clamping position at any suitable point in the travel of the belt, and cam guides so shaped as to rock the arms into clamping position.

In testimony that I claim the foregoing as my invention, I have signed my name this ninth day of May, 1927.

R. B. PITT.